United States Patent [19]

Shoemaker

[11] Patent Number: 5,508,902

[45] Date of Patent: Apr. 16, 1996

[54] METHODS AND APPARATUS FOR THE INTERLOCKING OF PARTS BY A TAB-AND-SLOT ARRANGEMENT

[75] Inventor: David C. Shoemaker, Vicksburg, Miss.

[73] Assignee: Cooper Industries, Inc., Houston, Tex.

[21] Appl. No.: 286,216

[22] Filed: Aug. 5, 1994

[51] Int. Cl.[6] .................................................... F21Y 7/00
[52] U.S. Cl. .................... 362/346; 362/260; 362/296; 362/341; 52/591.2; 403/242; 403/403
[58] Field of Search .......................... 52/588.1, 591.2; 403/231, 403, 242; 362/217, 260, 296, 297, 341, 349, 362, 346

[56] References Cited

U.S. PATENT DOCUMENTS

| | | | |
|---|---|---|---|
| 3,867,047 | 2/1975 | Wightman et al. | 403/242 |
| 4,199,907 | 4/1980 | Bains et al. | 403/403 X |
| 5,034,859 | 7/1991 | Gawad et al. | 362/217 |

Primary Examiner—Stephen F. Husar
Attorney, Agent, or Firm—Burns, Doane, Swecker & Mathis

[57] ABSTRACT

First and second parts of a metal reflector of a light fixture are interconnected by tab-and-slot arrangements. The first part has hook-shaped tabs and an abutment tab projecting from an edge thereof. The second part has slots for receiving respective tabs. When the parts are converged in a first direction to cause the hook-shaped tabs to enter their respective slots, the abutment tab is offset from its respective slot, whereupon the abutment tab elastically deforms the second part such that the abutment tab and second part are biased toward one another while the deformation exists. When the parts are subsequently moved in a second direction (perpendicular to the first direction) to cause the hook-shaped projections to move within their slots and capture the second part, the abutment tab becomes aligned with, and enters, its slot. Hence, the hook-shaped tabs oppose separation of the parts in the first direction, and the abutment tab prevents the parts from being moved sufficiently in the second direction to dislodge the hook-shaped tabs from their slots.

14 Claims, 2 Drawing Sheets

METHODS AND APPARATUS FOR THE INTERLOCKING OF PARTS BY A TAB-AND-SLOT ARRANGEMENT

BACKGROUND OF THE INVENTION

The present invention relates to the interconnection of parts by means of tabs, especially the interconnection of metal sheet sections of a reflector for a light fixture.

It is conventional in the fabrication of light fixtures to provide a reflector which lies behind the lamp to reflect light toward an area to be illuminated. Some reflectors are formed of metal sheet parts which are joined together, e.g., by separate fasteners or by means of tab-and-slot connections. In a tab-and-slot connection, one part possesses outwardly projecting tabs which are insertable into respective slots formed in another part. Then, an operator deforms (e.g., bends or twists) the tabs, usually by means of a tool such as pliers, to lock the parts together.

It would be desirable to simplify the procedure of interlocking the parts by eliminating the need for deforming the tabs.

SUMMARY OF THE INVENTION

The present invention involves a method of joining together first and second parts, e.g., such as parts of a reflector for a light fixture. In performing the method, relative movement is effected between the first and second parts along a first path of travel so that a first tab formed on the first part enters a first slot formed in the second part, and so that a second tab formed on one of the first and second parts abuts a region of the other of the first and second parts to cause at least one of the first and second parts to be elastically deformed away from the other and thereby bias the second tab and the region of the other part toward one another. Thereafter, relative movement is effected between the first and second parts along a second path of travel oriented transversely to the first path of travel so that an end edge of the first slot enters a recess formed by the first tab to oppose separation of the first and second parts along the first path of travel, and so that the second tab becomes aligned with a second slot formed in the other part to enable the second tab to enter the second slot under the influence of the aforementioned bias, whereupon relative movement between the first and second parts along the second path of travel sufficient to displace the end edge from the recess is prevented by engagement between the second tab and the second slot.

Preferably, the first tabs are hook-shaped, and there are at least two of such hook-shaped tabs, with the second tab being situated between the hook-shaped tabs.

The present invention also relates to the combination of the first and second parts to be joined together in the aforementioned manner.

BRIEF DESCRIPTION OF THE DRAWINGS

The objects and advantages of the invention will become apparent from the following detailed description of a preferred embodiment thereof in connection with the accompanying drawings in which like numerals designate like elements and in which.

DETAILED DESCRIPTION OF A PREFERRED EMBODIMENT OF THE INVENTION

Figure 1:
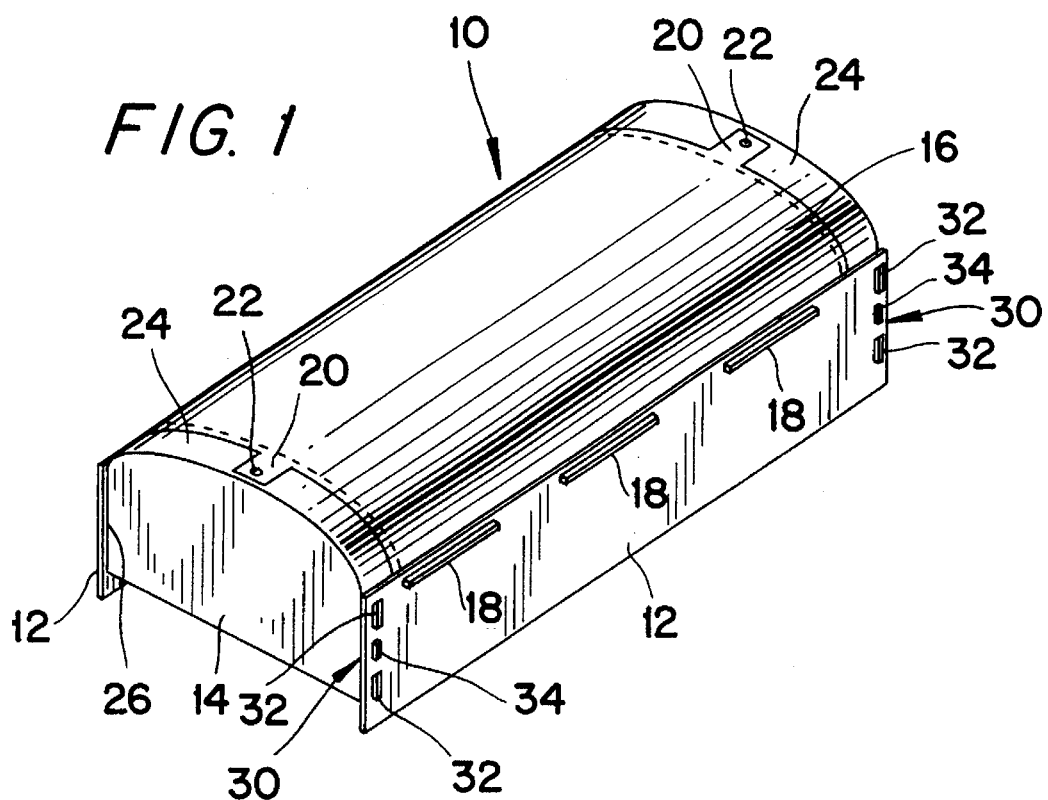
FIG. 1 is a top perspective view of a reflector for a light fixture which is assembled in accordance with the present invention.

Depicted in FIG. 1 is a reflector 10 for a light fixture, such as a flood light utilizing a high intensity discharge lamp. It will become apparent that the invention can be used with other types of light fixtures and with items other than light fixtures. The reflector 10 is formed of a plurality of interconnected sheet metal parts (e.g., aluminum), including two side parts 12, two end parts 14 (only one shown) and a back part 16. Terms such as upwardly, vertically, horizontally, etc., as used in the following text should be considered with reference to one installed, operable state of the fixture wherein the back part 16 is located above the side and end parts. Of course, it would be possible for the fixture to be disposed in other orientations when being used.

The back part 16 is curved and each lower edge thereof includes a plurality of horizontal tabs 18 which extend through corresponding slots formed adjacent an upper edge of a respective side part 12. If desired, the back part can be secured to the end parts 14 by means of fasteners. Depicted in FIG. 1 are two tabs 20 of the back part which include apertures 22 aligned with apertures (not shown) formed in flange portions 24 of the end parts 14, for receiving the fasteners, such as screws.

As thus-far described, the reflector is conventional, and the end parts 14 and side parts 12 would be interlocked by inserting conventional tabs of one part into slots of the other part and then deforming the tabs.

Figure 2:
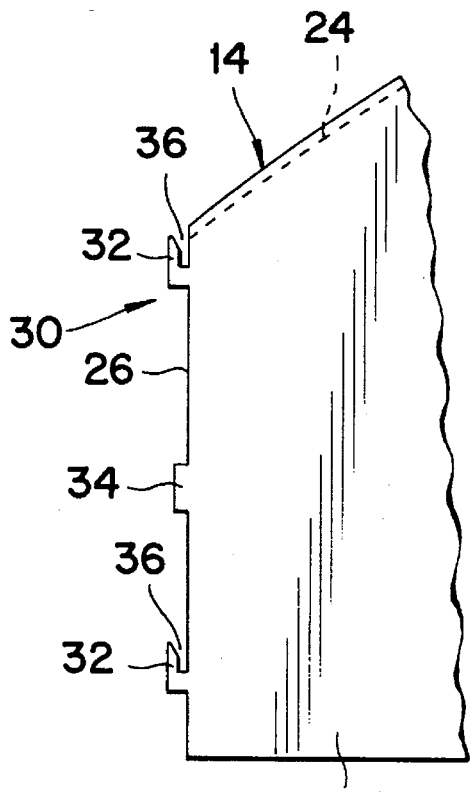
FIG. 2 is a front elevational view of a portion of an end part of the reflector depicted in FIG. 1.

However, in accordance with the present invention, the end parts 14 and side parts 12 are joined together by tab-and-slot connections 30 which do not require that the tabs be deformed. The tabs of the tab-and-slot connection are depicted in FIG. 2 as being of integral one-piece construction with a vertical edge 26 of the main body 27 of the end part 14. Those tabs include two identical hook-shaped tabs 32 and a rectangular abutment tab 34 situated vertically between the hook-shaped tabs 32. The tabs 32, 34 project from the edge of the flat plate so as to be coplanar therewith. Both of the hook-shaped tabs 32 extend in the same direction (i.e., upwardly), and each of those tabs 32 forms an upwardly open vertical recess 36 between itself and the edge 26.

Figure 3:
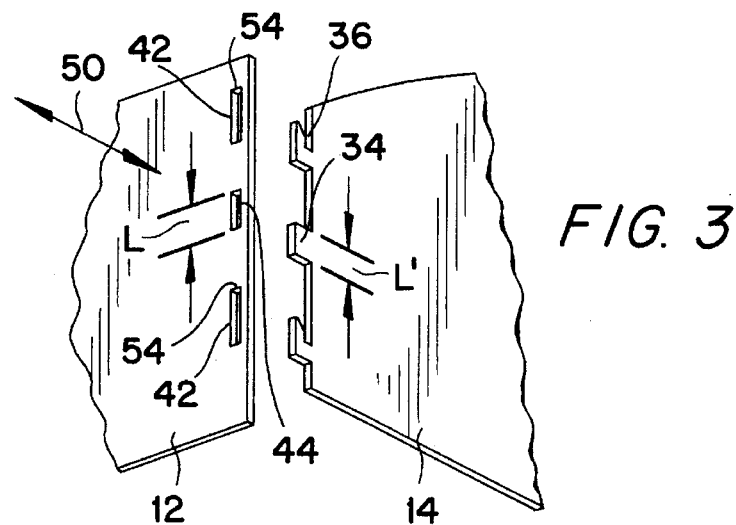
FIG. 3 is a bottom perspective view of a side part and an end part of the reflector, as those parts are being converged together.

As depicted in FIG. 3, each side part 12 includes two identical first slots 42, and a second slot 44 situated vertically between successive first slots 42. Each of the first and second slots 42, 44 is open in a horizontal direction oriented perpendicular to the plane of the side part 12. The first slots 42 are positioned so that they can be aligned simultaneously with respective ones of the hook-shaped tabs 32. On the other hand, the second slot 44 is positioned such that when the first slots 42 are aligned with the hook shaped tabs 32, the second slot 44 is offset from the abutment tab 34 in a direction parallel to the lengths of the slots, i.e., in a vertical direction.

Figure 4:
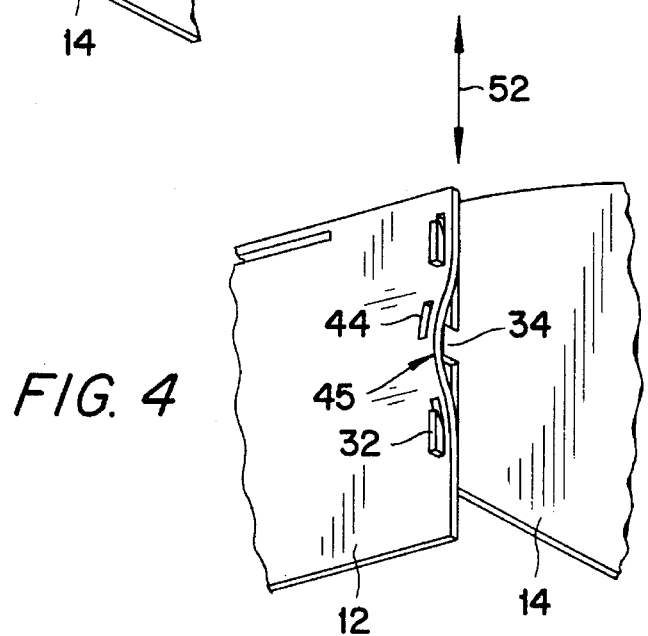
FIG. 4 is a view similar to FIG. 3 after a pair of hook-shaped tabs of the end part have entered respective slots of the side part.

Accordingly, when the parts 12, 14 are converged along a first (e.g., horizontal) path of travel 50 (see FIG. 3) with the first slots 42 aligned with the hook-shaped tabs 32, the hook-shaped tabs 32 enter the first slots 42, but the abutment tab 34 abuts a region 45 of the side part 12 and elastically (not plastically) deforms that region 45 (see FIG. 4). The side part 12 is formed of an elastically recoverable material, such as aluminum, so that the abutment tab 34 and the side part 12 are biased toward one another while the deformation exists.

Once the hook-shaped tabs 32 have passed through their respective first slots 42, the parts 12, 14 are capable of relative movement along a second (e.g., vertical) path of travel 52 (see FIG. 4), there occurs relative movement between the slots 32, 34 and the slots 42, 44. As that relative movement occurs, end edges 54 of the first slots 42 enter the recesses 36 formed by the first slots 42 so that separation of the parts 12, 14 along the travel path 50 is opposed by the hook-shaped tabs 32.

Figure 5:
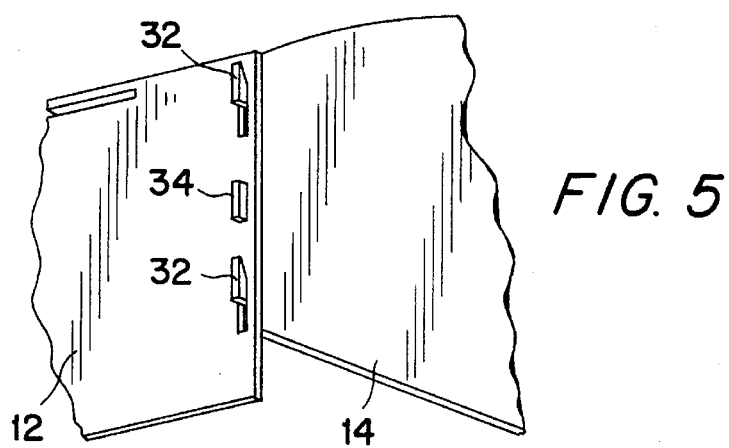
FIG. 5 is a view similar to FIG. 4 after further relative movement has occurred between the side and end parts sufficient for completing the interlocking engagement between the parts.

The amount of relative movement between the parts 12, 14 along the path of travel 52 is sufficient to enable the abutment tabs 34 to come into alignment with the second slot 44. Accordingly, since the deformed region 45 of the second part 12 and the abutment tab 34 are biased toward one another, the abutment tab will enter the second slot 44 with a snap action as the deformation of the side part 12 is relieved (see FIG. 5). The length L of the second slot 44 is substantially equal to the length $L^1$ of the abutment tab 34. The engagement between the second slot 44 and the abutment tab 34 prevents the parts 12, 14 from moving relative to one another along the travel path 52 sufficiently to enable the end edges 54 of the first slots 42 to fully emerge from the recesses 36 formed by the hook-shaped tabs 32. The second slot 44 could be slightly larger than the abutment tab 34 to facilitate entry of that tab into the slot 44, as long as any subsequent relative movement between the parts permitted thereby along the travel path 52 is insufficient to enable the slot edges 54 to emerge from the recesses 36.

As a result, the parts 12, 14 are effectively locked together without the need for deforming the tabs, and without the need for separate fasteners (e.g., clips, screws, etc.).

In practice, the side and end parts 12, 14 would be joined together, and then the cover 16 would be joined to the side and end parts.

It will be appreciated that any number of first and second slots 42, 44 (and corresponding tabs 32, 34) could be utilized. Also, the parts 12, 14 could be formed of any suitable material which is elastically recoverable, such as plastic and other metals in addition to aluminum.

Moreover, although the tabs 32, 34 are shown in the drawing as being coplanar with the main body 27 of their respective end part 12, they could instead project perpendicularly to the part 12 in cases where the parts being connected are intended to be parallel to one another after being joined. In that case, it is possible that the elastic deformation which occurs during the joining process will occur in both of the parts, i.e., both parts would be elastically deformed. (In the embodiment according to FIGS. 1–5, the coplanar relationship between the tabs 32, 34 and the first part 12 makes it unlikely that the first part 12 would undergo any appreciable elastic deformation.)

While the present invention is disclosed in connection with the interlocking of parts of a light reflector, it will be appreciated that the invention has application in the assembly of any article in which a tab-and-slot connection is appropriate.

Although the present invention has been described in connection with preferred embodiments thereof, it will be appreciated by those skilled in the art that additions, deletions, modification, and substitutions not specifically described may be made without departing from the spirit and scope of the invention as defined in the appended claims.

What is claimed is:

1. A method of joining together first and second parts, comprising the steps of:
    A) effecting relative movement between said first and second parts along a first path of travel so that:
        A1) a first tab formed on said first part enters a first slot formed in said second part, and
        A2) a second tab formed on one of said first and second parts abuts a region of the other of said first and second parts to cause at least one of said first and second parts to be elastically deformed away from the other and thereby bias said second tab and said region of said other part toward one another;
    B) effecting relative movement between said first and second parts along a second path of travel oriented transversely to said first path of travel so that:
        B1) an end edge of said first slot enters a recess formed by said first tab to oppose separation of said first and second parts along said first path of travel, and
        B2) said second tab becomes aligned with a second slot formed in said other part to enable said second tab to enter said second slot under the influence of said bias, whereupon relative movement between said first and second parts along said second path of travel sufficient to displace said end edge from said recess is prevented by engagement between said second tab and said second slot.

2. The method according to claim 1, wherein step A2 comprises effecting said relative movement along said first path of travel so that said second tab formed on said first part abuts said second part.

3. The method according to claim 1, wherein step A comprises effecting said relative movement along said first path of travel so that said first and second parts are substantially perpendicular to one another in the vicinity of said tabs and slots.

4. The method according to claim 1, wherein step A1 comprises effecting said relative along said first path of travel so that a hook-shaped first tab enters said first slot.

5. The method according to claim 1, wherein step A comprises effecting said relative movement along said first path of travel such that a pair of said first tabs formed on said first part enter respective ones of a pair of said first slots formed in said second part, and such that said second tab, positioned between said pair of first tabs, abuts said other part.

6. The method according to claim 1, wherein said first and second parts constitute parts of a reflector for a light fixture, said steps A, A1, A2, B, B1, B2 constitute steps in the assembly of the reflector.

7. A method of joining first and second parts, comprising the steps of:
    A) effecting relative movement between said first and second parts along a first path such that said first and second parts approach one another substantially perpendicularly, and so that:
        A1) a pair of hook-shaped tabs coplanar with said first part and formed on an edge thereof enter respective first slots formed in said second part, and A2) an abutment tab formed on said edge between said hook-shaped tabs and coplanar with said first part abuts a region of said second part to cause at least one of said first and second parts to be elastically deformed away from the other and thereby bias said abutment tab and said region of said second part toward each other;

B) effecting relative movement between said first and second parts along a second path of travel oriented transversely to said first path of travel so that:

B1) end edges of said first slots enter recesses formed by respective ones of said hook-shaped tabs to oppose separation of said first and second parts along said first path of travel, and B2) said abutment tab becomes aligned with a second slot formed in said second part to enable said abutment tab to enter said second slot under the influence of said bias, whereupon relative movement between said first and second parts along said second path of travel sufficient to displace said end edges of said first slots from said recesses is prevented by engagement between said abutment tab and said second slot.

8. The method according to claim 7, wherein said first and second parts constitute parts of a reflector for a light fixture, said steps A, A1, A2, B, B1, B2 constitute steps in the assembly of the reflector.

9. In combination, first and second parts to be joined together, said first said part containing a pair of first tabs and a second tab situated between said first tabs, said second part containing a pair of first slots and a second slot situated between said first slots, said first slots spaced apart so as to be simultaneously alignable with respective first tabs and enable said first tabs to enter respective ones of said first slots along a first path of travel, said second slot situated for non-alignment with said second tab during entry of said first tabs into said first slots, whereby said second tab abuts a region of said second part to elastically deform at least one of said first and second parts away from the other and bias said second tab and region of said second part toward one another, each of said hook-shaped tabs forming a recess extending parallel to said first slots to permit relative movement between said first and second parts along a second path of travel oriented transversely to said first path of travel sufficiently to enable end edges of said slots to be captured in respective ones of said recesses and to enable said second tab and second slot to become aligned so that said second tab enters said second slot.

10. The combination according to claim 9, wherein said first part includes a flat body on which said first and second tabs are situated.

11. The combination according to claim 10, wherein said first and second tabs are substantially coplanar with said flat body.

12. The combination according to claim 9, wherein said first tabs are hook-shaped.

13. The combination according to claim 9, wherein said first and second parts are formed of sheet metal.

14. The combination according to claim 9, wherein said first and second parts constitute parts of a reflector for a light fixture.

* * * * *